April 10, 1945.   O. K. KJOLSETH   2,373,581

TRUCK SUSPENSION SYSTEM

Filed Dec. 18, 1941

Inventor:
Ole K. Kjolseth,
by Harry E. Dunham
His Attorney.

Patented Apr. 10, 1945

2,373,581

UNITED STATES PATENT OFFICE 2,373,581

TRUCK SUSPENSION SYSTEM

Ole K. Kjolseth, Erie, Pa., assignor to General Electric Company, a corporation of New York Application December 18, 1941, Serial No. 423,495

3 Claims. (Cl. 105—194)

My invention relates to suspension systems for railway trucks and to an improved truck construction.

An object of my invention is to provide an improved suspension system for railway trucks.

Another object of my invention is to provide an improved railway truck construction provided with a longitudinally extending spring and equalizer suspension system for supporting the truck on its axles.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
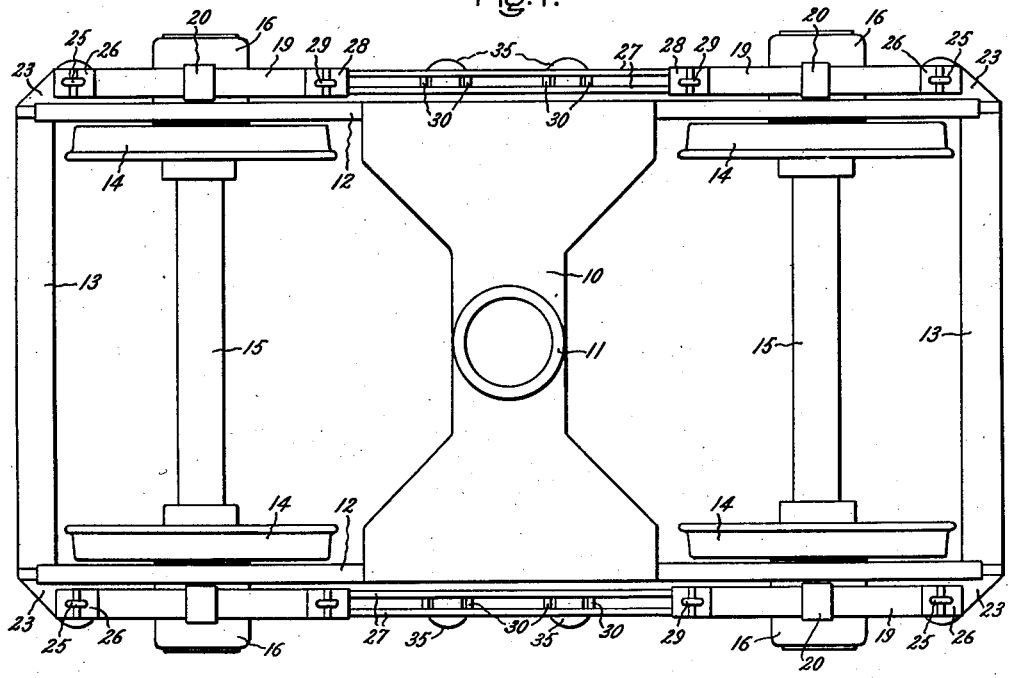
Figure 2:
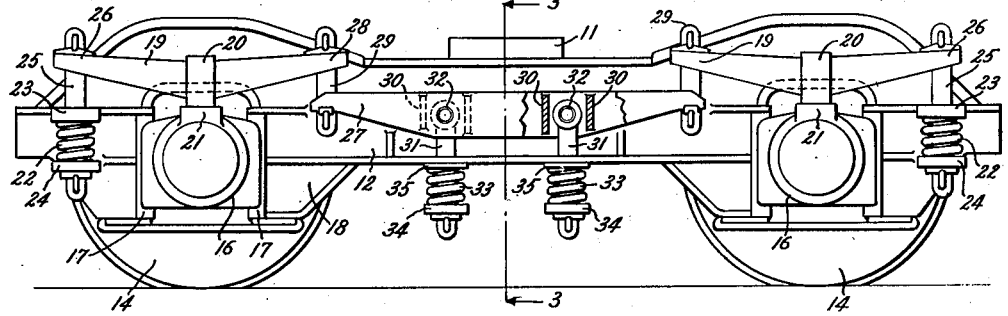
Figure 3:
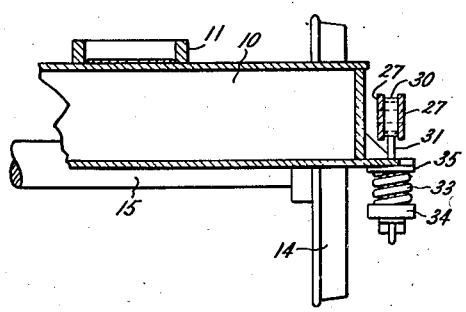

In the drawing, Fig. 1 is a plan view of a railway truck embodying my invention; Fig. 2 is a side elevational view of the truck shown in Fig 1, partly broken away to show more clearly the equalizer supporting connection; and Fig. 3 is a sectional view taken along line 3—3 of Fig. 2 showing a part of the truck.

Referring to the drawing, I have shown a truck provided with a frame including a transversely extending bolster 10 provided with a center plate 11 adapted to support the center bearing of a railway vehicle. The bolster 10 is secured at each end to side frame members 12 which are integrally secured together at the ends thereof by transversely extending end frames 13 secured thereto. This truck frame is adapted to be supported by wheels 14 which are mounted on and support axles 15. The ends of the axles 15 are journaled in bearings arranged in journal boxes 16 about which the side frames 12 extend and these journal boxes are engaged by pedestal bearings 17 of the side frames for guiding the journal boxes in pedestal jaws 18 of the side frames. In order to support the truck frame on the axles 15, a longitudinally extending spring suspension system is provided which includes longitudinally extending spring members 19 arranged on each side of the truck and supported on the ends of the axles 15 by engagement of spring bands 20 with bearing seats 21 formed on the upper surface of the journal boxes 16. These longitudinally extending spring members 19 are secured at their outer ends to the outer ends of the side frames 12 and are adapted to support these ends of the side frames on resilient coil springs 22 which engage spring seats 23 formed as integral parts of the side frames 12. The springs 22 are mounted on spring seats 24 supported on the lower ends of spring hangers 25 which engage the outer ends 26 of the longitudinal spring members 19. The load on each side of the truck is equalized between the two axles by a longitudinally extending equalizer member 27 which is supported, as shown in Fig. 2, only at each end thereof on the inner ends 28 of the longitudinal springs 19 by spring hangers 29 which engage the inner ends 28 of the springs 19 and the ends of the equalizer 27. The equalizer 27 is formed of two similar longitudinally extending bars which are secured together intermediate their ends by transversely extending plates 30. A pair of resilient members is arranged to support the truck frame on the equalizer 27 and includes a pair of longitudinally spaced apart spring hangers 31 which are pivotally secured by pivot pins 32 to the equalizer 27. These spring hangers are arranged intermediate the ends of the equalizer 27 and are provided with resilient coil springs 33 which are supported on spring seats 34 mounted on the lower ends of the spring hangers 31. The upper ends of these springs are arranged in engagement with spring seats 35 secured to the side frames 12 to provide longitudinally spaced apart resilient supports for these side frames on the equalizer 27.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim is new, and desire to secure by Letters Patent of the United States is:

1. A truck frame suspension system including a longitudinally extending equalizer member, means including longitudinally extending springs adapted to be supported by axles and having other spring means for resiliently connecting the ends of said equalizer member to said truck frame and arranged to provide the only support for said equalizer member, and means including a pair of longitudinally spaced apart hangers pivotally secured to said equalizer member and provided with resilient coil spring means for supporting said truck frame on said equalizer member.

2. A railway truck having wheels and axles supported thereby, a truck frame having side frames, and a suspension system for supporting said truck frame on said axles including on each side thereof a resilient longitudinally extending member supported on each of said axles, resilient spring means for supporting the outer ends of said side frames on the outer end of each of said longitudinal members, a longitudinally extending equalizer member supported only at each end thereof on the inner ends of said longitudinal members, and a pair of resilient means pivotally connected to said equalizer member for supporting said side frame on said equalizer member.

3. A railway truck having wheels and axles supported thereby, a truck frame having side frames, and a suspension system for supporting said truck frame on said axles including on each side a longitudinally extending spring member supported on each of said axles, resilient means for connecting the outer end of each of said longitudinal spring members to one of said side frames, a longitudinally extending equalizer member connected to the inner ends of each of said longitudinal spring members for providing the only support for said equalizer member, and means including a pair of longitudinally spaced apart hangers pivotally secured to said equalizer member and provided with resilient spring means for supporting said side frame on said equalizer member.

OLE K. KJOLSETH.